Nov. 30, 1971  K. WAGNER ET AL  3,623,408
AUTOMATIC EXPOSURE CONTROL ARRANGEMENT
FOR PHOTOGRAPHIC APPARATUS
Filed Aug. 6, 1970  2 Sheets-Sheet 1

INVENTOR
Dr. KARL WAGNER
KLAUS NICOLAY

BY

United States Patent Office 3,623,408
Patented Nov. 30, 1971

3,623,408
AUTOMATIC EXPOSURE CONTROL ARRANGE-
MENT FOR PHOTOGRAPHIC APPARATUS
Karl Wagner, Ottobrunn, and Klaus Nicolay, Gruenwald, Germany, assignors to Agfa-Gevaert Aktiengesellschaft, Leverkusen, Germany
Filed Aug. 6, 1970, Ser. No. 61,597
Claims priority, application Germany, Aug. 20, 1969,
P 19 42 286.7
Int. Cl. G01j 1/02
U.S. Cl. 95—10 C                    8 Claims

ABSTRACT OF THE DISCLOSURE

A capacitor, connected in the diagonal of a bridge, is charged to an amount and polarity dependent on the relative brightness of light incident on two series-connected photoconductors that are arms of the bridge. One photoconductor is exposed to direct scene light and the other to scene light through the objective. The capacitor is then connected to the base of a transistor and also to charge (or first discharge and then charge) through the one photoconductor until it reaches a value at which the transistor turns on, thereby turning off a further transistor, the collector of which is connected to the shutter control magnet.

BACKGROUND OF THE INVENTION

The invention relates to an automatic exposure control arrangement for use in photographic apparatus, such as a single-lens reflex camera. The control arrangement has a light-sensitive means, such as a photoconductor, that is exposed to scene light passing through the objective, and capacitor means for storing a charge dependent on the strength of the scene light as detected by the light-sensitive means.

SUMMARY OF THE INVENTION

An object of the invention is an automatic exposure control arrangement for photographic apparatus that enables the exposure to be controlled while the exposure is being made. A further object of the invention is an automatic exposure control arrangement for single-lens reflex cameras that enables the exposure to be controlled while the reflector is pivoted out of the optical path of the camera objective.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
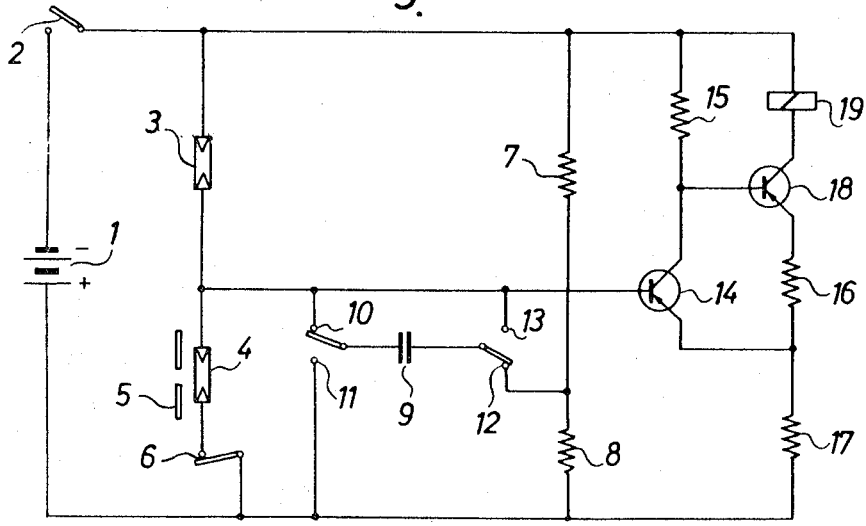
FIG. 1 is a circuit diagram of an embodiment of the invention.

With reference to FIG. 1, an operating switch 2 connects the electronic exposure control arrangement of the invention with a voltage source 1. A photoconductor 3, which is connected in one arm of a bridge, is exposed to direct scene light. Another photoconductor 4, which is connected in a second arm of the bridge, is exposed to scene light through the camera objective 20 before the exposure is made. The objective diaphragm is positioned in front of the photoconductor 4. A switch 6 enables the latter photoconductor to be removed from circuit by disconnecting it from the positive terminal of the voltage source 1.

The other two arms of the bridge are composed of resistances 7 and 8 of equal resistance value. Connected across one diagonal of the bridge is a capacitor 9. One plate of the capacitor is connected through a contact 10 of a switch 10, 11 to the common junction between the two photoconductors 3 and 4. The other plate of the capacitor 9 is connected through the contacts 12 of a switch 12, 13 to the junction of the resistors 7 and 8. The contacts 11 and 13 respectively enable the capacitor 9 to be connected to the positive terminal of the source 1 and to the junction between the photoconductors 3 and 4. The common junction between the photoconductors 3 and 4 is connected to the base of a transistor 14, the collector circuit of which contains a resistor 15. The emitter of this transistor is connected to the common junction between two resistors 16 and 17, which are connected to the emitter of a further transistor 18. The base of transistor 18 is connected to the collector of transistor 14. A magnet 19 for operating the camera shutter, not shown, is connected to the collector of transistor 18.

Figure 2:
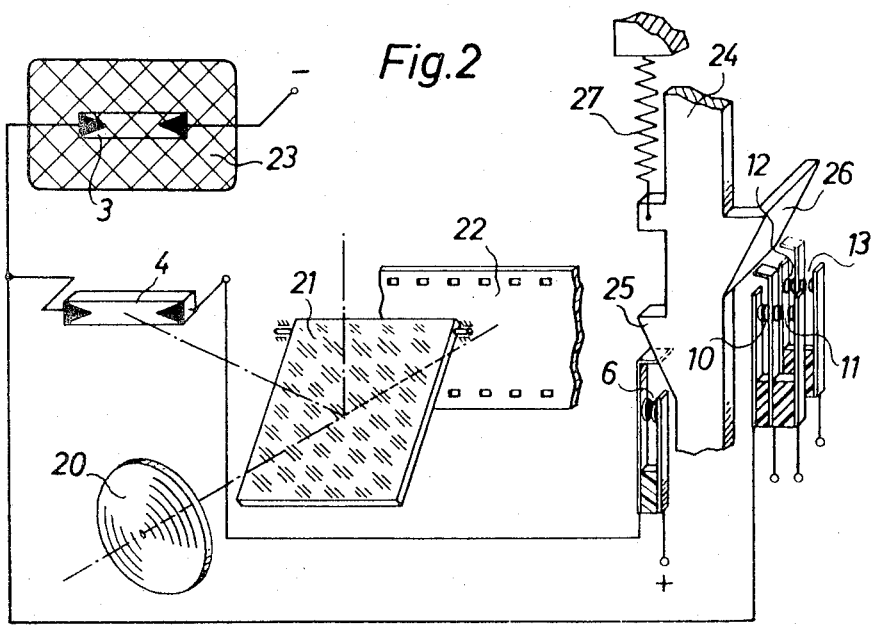
FIG. 2 is an embodiment of the mechanical arrangement of the invention.

As shown in FIG. 2, light that has passed through the objective 20 is reflected by the pivotally mounted mirror 21 to the photoconductor 4. The unexposed film is denoted by the reference numeral 22. The photoconductor 3 is exposed to direct scene light through a window 23. A release 24 is biased by a spring 27. A sloping shoulder 25, provided on the release 24, operates the switch 6 to open the latter. A sloping projection 26, also provided on the release 24, operates the switches 10, 11 and 12, 13.

The circuit operates in the following manner. When the release 24 is operated by being pushed downward, the operating switch 2 is first of all closed, in a way not shown, so that the voltage source 1 is connected to the exposure control arrangement of the invention.

Assuming that the resistance of the two photoconductors 3 and 4 are equal, whereby the bridge is balanced, the capacitor 9 does not charge and consequently there is no voltage across it. As the release 24 is further pushed down, the mirror 21 is freed so that it can pivot out of the light path of the objective. At the same time the projection 25 opens the switch 6, so that the photoconductor 4 is disconnected from the voltage source 1. When the switch 6 is opened the contact 11 is simultaneously closed, so that one plate of the capacitor 9 is connected to the positive terminal of the voltage source 1. The contact 13 is simultaneously closed, thereby connecting the other plate of the capacitor 9 to the common junction of the two photoconductors 3 and 4. The capacitor 9 now begins to charge through the photoconductor 3 for determining the exposure time. After a definite time, which is dependent upon the amount of light incident on the photoconductor 3, the capacitor 9 has charged to such a value that the base of transistor 14 is negative with respect to its emitter. Consequently, transistor 14 is turned on, causing the transistor 18 to be turned off. The shutter control magnet 19 is thereby de-energized, and the exposure is ended. After the release 24 is freed all movable parts return to their starting positions. The switches return to the positions shown in FIG. 1.

If less scene light is incident on photoconductor 4 than upon photoconductor 3, the bridge is unbalanced. The consequence is that the plate of the capacitor 9 connected to the photoconductor is more negative than the plate connected to the resistors 7 and 8. After the contacts 11 and 13 are closed there is on the capacitor 9 a voltage that is dependent on the difference between the resistance of the two photoconductors 3 and 4. The polarity of this voltage is such that, after the contact 13 is closed, the plate of the capacitor 9 connected to the base of the transistor 14 is more positive than the positive terminal of the voltage source 1. The voltage across the capacitor adds to the voltage of the source 1. Beginning with a charge of this polarity, the capacitor first discharges and then begins to charge in the opposite direction until that voltage is reached at which the transistor 14 is turned on, thereby turning off the transistor 18 and de-energizing the shutter control magnet 19. In this case, the exposure time is longer than it is when the bridge is balanced. The degree to which the exposure time is longer is dependent upon the difference in resistance between the two photoconductors 3 and 4.

If the resistance of photoconductor 3 is greater than that of photoconductor 4, the bridge is likewise unbalanced. The capacitor 9 is again charged, but in a direction opposite to that in which it was charged in the previous example. After the contacts 11 and 13 are closed the plates of the capacitor 9 connected to the base of transistor 14 is negative. Beginning at this negative potential the capacitor continues to charge in the same direction. Before the voltage across the capacitor reaches the value of that of the source 1, the transistor 14 is turned on, thereby turning off transistor 18 and de-energizing the shutter control magnet 19.

The resulting exposure time is consequently shorter than that obtained when the bridge is balanced.

Figure 3:
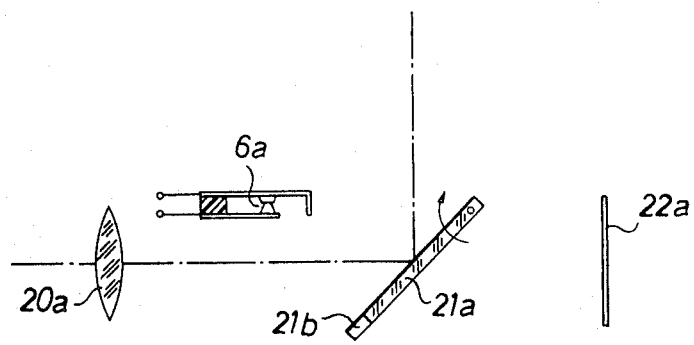
FIG. 3 shows a second embodiment of the mechanical arrangement of the invention.

In a modification of the invention, shown in FIG. 3, light passing through the objective 20a is normally reflected by the pivotal mirror 21a to the photoconductor 4, not shown. When the mirror 21a is released and pivots upward, the projection 21b on the mirror opens the switch 6a, which corresponds to the switch 6 shown in FIGS. 1 and 2. The light-sensitive film is denoted by the reference numeral 22a.

The invention provides a simple arrangement for taking into account the various light-transmission characteristics of the camera objective. In every case, the arrangement of the invention ensures that the film is correctly exposed.

It will be understood that each of the elements described above, or two or more together, may also find a useful application in other types of constructions differing from the types described above.

While the invention has been illustrated and described as embodied in an automatic exposure control arrangement for photographic apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a photographic apparatus having shutter means movable between open and closed positions with variable delay to determine the exposure time, a combination, comprising a picture-taking objective; and an exposure control means comprising an electric circuit having a first portion operative to close the shutter means, and a light-measuring second portion, said second portion comprising voltage divider means having first and second photosensitive means respectively exposed to direct scene light and to scene light that has passed through said objective, and capacitor means connected to assume a first charge, determined by both of said first and second photosensitive means, and a predetermined second charge for operating said first portion of said electric circuit, said second charge following said first charge at a time delay dependent at least on the magnitude of said first charge and on the intensity of scene light as detected by said first photosensitive means.

2. In a photographic apparatus as defined in claim 1, including bridge means comprising said first and second photosensitive means as first and second arms thereof having a common junction, and two resistance means as third and fourth arms thereof having a common junction, said first and second photosensitive means being series-connected, and voltage source means having positive and negative poles connected across said first and second photosensitive means, first switch means for sequentially connecting said capacitor means first between the common junctions of said first, second and third, fourth bridge arms to assume said first charge, and then between one of said poles of said voltage source means and said common junction of said first and second photosensitive means to assume said second charge, whereby the time delay is also dependent on the polarity of said first charge.

3. In a photographic apparatus as defined in claim 2, wherein the plates of said capacitor means when respectively connected to the common junction of said first, second and third, fourth bridge arms to assume said first charge are respectively connected to one pole of said voltage source means and to said common junction of said first and second bridge arms to assume said second charge.

4. In a photographic apparatus as defined in claim 3, wherein said electric circuit first portion has an input, and said first switching means connects said input to said common junction of said first and second bridge arms while said capacitor means assumes said second charge, and further including second switch means for disconnecting said second photosensitive means from circuit while said capacitor means assumes said second charge.

5. In a photographic apparatus as defined in claim 4, including pivotal reflector means normally in a first position in the light path of said objective and pivotal to a second position out of said light path, and wherein said second switch means are positioned to be operated by pivotal movement of said reflector means to said second position, whereby to disconnect said second photosensitive means from circuit.

6. In a photographic apparatus as defined in claim 4, including release means for operating said second switch means.

7. In a photographic apparatus as defined in claim 6, wherein said release means also operates said first switch means.

8. In a photographic apparatus as defined in claim 2, wherein said third and fourth bridge arms are equal in resistance value.

References Cited
UNITED STATES PATENTS 3,353,462  11/1967  Suzuki _____ 95—10 C SAMUEL S. MATTHEWS, Primary Examiner M. H. HAYES, Assistant Examiner